May 12, 1970 S. I. FINKEL ET AL 3,512,151

DIGITAL CONVERSION SYSTEMS

Filed Feb. 1, 1966 3 Sheets-Sheet 1

INVENTORS.
SEYMOUR I. FINKEL,
WARREN M. JANES &
RAGNAR N. NILSEN

Brumbaugh, Free, Graves & Donohue their ATTORNEYS

May 12, 1970 S. I. FINKEL ET AL 3,512,151

DIGITAL CONVERSION SYSTEMS

Filed Feb. 1, 1966 3 Sheets-Sheet 2

INVENTORS
SEYMOUR I. FINKEL,
WARREN M. JANES &
RAGNAR N. NILSEN

Brumbaugh, Free, Graves & Donohue their ATTORNEYS

INVENTORS.
SEYMOUR I. FINKEL,
WARREN M. JANES &
RAGNAR N. NILSEN
Brumbaugh, Free, Graves & Donohue
their ATTORNEYS United States Patent Office 3,512,151
Patented May 12, 1970

3,512,151

DIGITAL CONVERSION SYSTEMS

Seymour I. Finkel, East Orange, and Warren M. Janes, Dover, N.J., and Ragnar N. Nilsen, Los Angeles, Calif., assignors to Vitro Corporation of America, New York, N.Y., a corporation of Delaware Filed Feb. 1, 1966, Ser. No. 524,021
Int. Cl. H03k 13/17
U.S. Cl. 340—347 5 Claims

ABSTRACT OF THE DISCLOSURE

A computer system for extracting the explicit digital value of a variable $\theta$, from a trigonometric equation in which it appears implicitly. Signals from a digital generator are fed to simulators of the required trigonometric functions, and appropriate quantities are compared in a comparator in accordance with the equation to be solved. The error signal from the comparator is used to adjust the number stored in the digital generator.

This invention relates to digital systems employing digital-to-analog conversion, and more particularly to systems utilizing digital-to-analog conversion to obtain and employ non-linear functions of input variables.

There are many situations in which a computer must operate at high input data rates. In aircraft fire control systems, for example, an airborne computer should have the capability of developing signals for presentation to the weapons system with as little time lag as possible and at the utmost possible accuracy. Since the data from which the control signals evolve in the computer are continuously changing, it is desirable that the computer be able to meet stringent speed and accuracy requirements.

Many analog computers, therefore, are not entirely satisfactory for such applications, since the useful input data rate is limited by the computing velocity, or velocity constant, of electromechanical components. For this reason, digital systems are often preferable to analog systems. An all-digital system is additionally advantageous because it is less bulky than an analog system, has far fewer moving parts, is considerably lighter in weight, and provides the superior reliability and life expectancy requisite to airborne computations. However, known digital systems usually incorporate some electromechanical components where necessary to, for example, generate non-linear functions or present non-digital visual displays of input information and variables computed from such information, and such electromechanical components slow up the operation of the digital computer.

One aspect of this invention, therefore, relates to the obtaining of a non-linear function of a variable by the conversion of digital signals to analog signals without the employment of electromechanical devices, so as to thereby avoid disadvantages associated with the use of electromechanical components in analog or digital computers. Specifically, digital information is operated on in digital-analog converter means to generate one or more non-linear functions of an input or computed variable. In accordance with the invention and the objects thereof, this is achieved by approximating each of such one or more functions with a predetermined number of linear segments, the number of which is determined by the permissible deviation between the function as computed by the approximation and the true value of the function. A multi-bit binary digital input signal representing the variable whose function is to be derived is interpreted to determine in which approximating segment, i.e., between which two intercept points of successive approximating segments, the value of the input variable lies, and an analog signal is developed which is representative of the magnitude of the function at a selected one of these intercept points.

The magnitude of the variable need be known only with enough accuracy to locate the proper intercept point. To that end, therefore, only the most significant bits of the digital signal need be sampled.

These same most significant bits are utilized to generate a second analog signal representing the slope of the determined segment. The lesser significant bits of the digital input signal are then used, in conjunction with the analog slope signal, to derive an analog signal corresponding to the incremental change along the segment in the value of the approximated function produced by the change in the variable from its approximate value at the selected intercept point of its accurate value as represented by all the bits of the digital signal. The latter analog signal is added to the analog intercept signal to arrive at the full approximated value of the function.

Another aspect of the invention relates to a computer system for extracting the explicit value of a variable from a mathematical relation in which the variable occurs implicitly as a function of such variable. In this connection, a signal representing the variable is fed from a source to means which responds to the variable signal to produce a signal representing the function. The function signal is fed to a simulator of the mathematical relation. If the function signal is of incorrect value, the simulator produces an error signal which operates on the source of the variable signal to drive it to a value which yields the correct function signal, and which is the explicit value sought for.

Still another aspect of the invention pertains to a digital system for the conversion of digital variable angle information into A.C. analog signals suitable for energizing the stator windings of a selsyn device for mechanically indicating the angle information. Each of the A.C. signals is generated in digital-to-analog converter means of the above-described type which generates either a sine or cosine function of an angle having a selected phase relationship (e.g., 0°, 120°, 240°) to the variable input angle. The selected phases of the respective angles correspond to the space phase relations of the magnetic axes of the selsyn, or synchro, windings. Thus, the generated signals for exciting the windings of, for example, a receiver synchro are identical to those that would be generated for those windings by using a synchro transmitter. It follows that the requirement for a separate synchro transmitter is completely eliminated.

For a better understanding of these and other aspects of the invention, reference may be made to the following detailed description, taken in conjunction with the accompanying drawings, in which.

Figure 1:
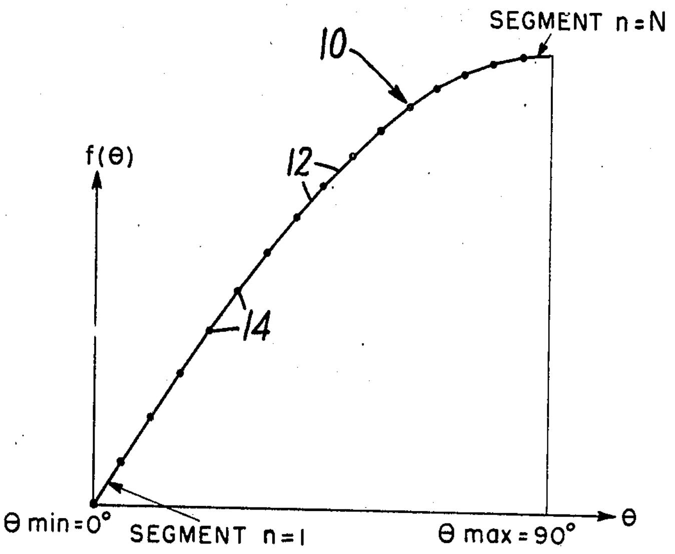
FIG. 1 is a graph of a representative function of a type which can be generated in accordance with the invention.

Referring now to FIG. 1, a continuous curve or function can be approximated by a number of straight line segments which pass through or intercept the function at various points; provided, however, that the irregularity of the shape of the function does not preclude the practicability of this method of approximation. FIG. 1 illustrates a graph of a line segment approximation of the sine function $f(\theta)$ of a variable angle $\theta$ between the limits of 0° and 90°. As illustrated, this curve 10 is the composite of a number of linear segments 12 lying between consecutive intercept points 14 which may or may not be particular values of the approximated function; i.e., since it is the overall shape and trueness of the approximated curve that is important, the "intercept" points will not necessarily coincide with the actual value of the function at any given value of the variable. The term "intercept points" as used hereinafter is defined as the point at which adjacent linear segments meet.

As shown by FIG. 1, the function $f(\theta)$ is approximated between the limits $\theta_{max}$, $\theta_{min}$ by dividing the function into N linear segments of equal horizontal length each having a slope $B(\theta_n)$ and connected between consecutive intercept points $A(\theta_n)$ and $A(\theta_{n+1})$, where $A(\theta_n)$ is the value of the approximated function at $\theta_n$. Each segment then, expresses the value of the function over $\Delta\theta=(\theta_{max}-\theta_{min})/N$. Since $A(\theta_n)$ corresponds to the value of the funnction at the lower intercept point of the $n$th segment, and $B(\theta_n)$ is the slope of the $n$th segment, an equation expressing the approximated function may be written. This is $$f(\theta)=A(\theta_n)+B(\theta_n)(\theta-\theta_n) \quad (1)$$

Figures 2, 3, 5:
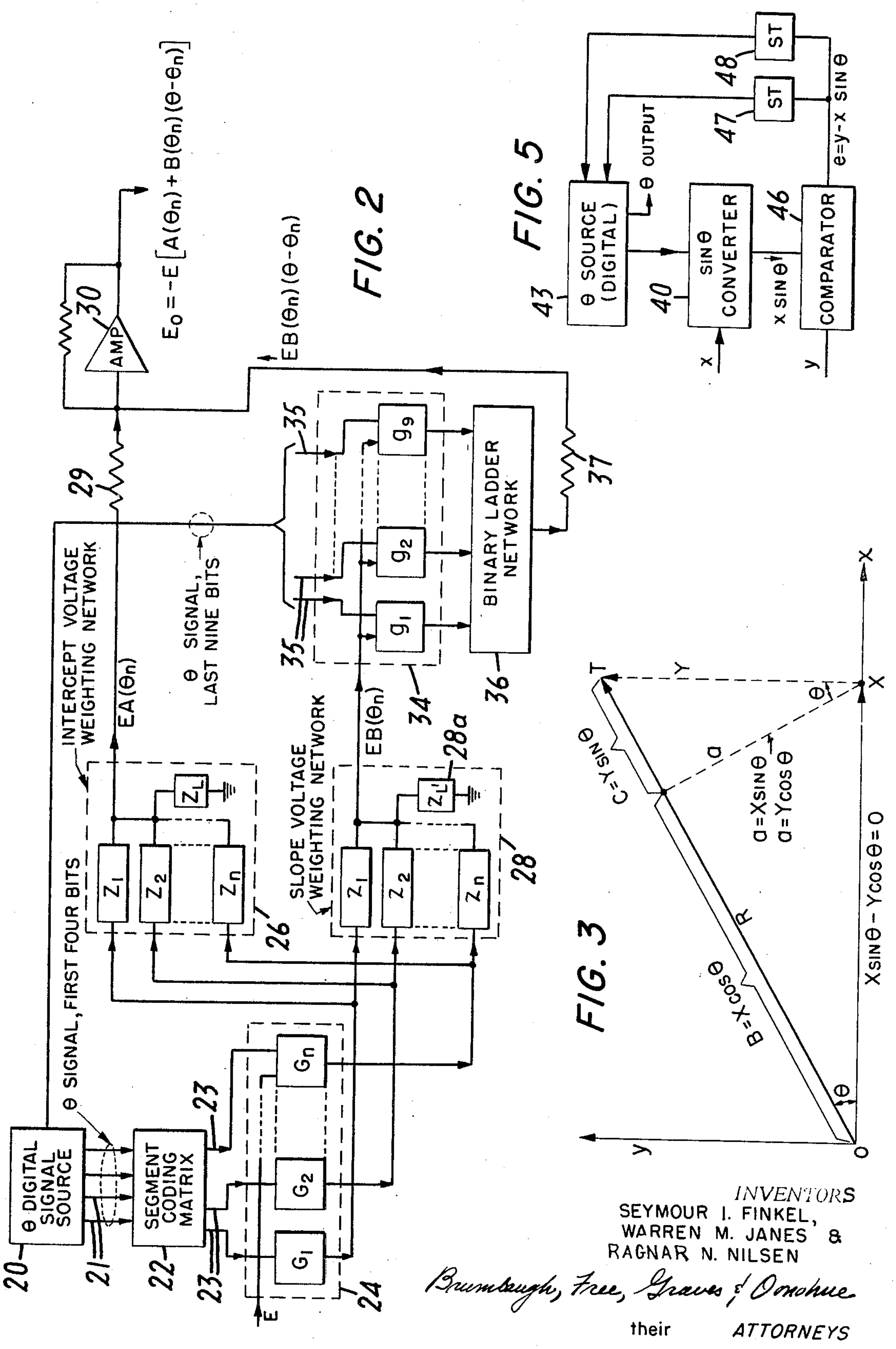
FIG. 2 is a block diagram of an embodiment of the invention for converting a digitally represented variable into an analog signal representing a non-linear function of that variable.
FIG. 3 is a geometric graph illustrating various mathematical relations between Cartesian coordinate quantities and polar coordinate quantities, the graph being useful in explaining applications of systems according to the invention.
FIG. 5 is a block diagram of a portion of the FIG. 4 system as modified to compute the explicit value of a variable involved in a mathematical relation in which the value of the variable is implicit.

FIG. 2 shows a preferred embodiment of a non-linear digital-to-analog converter, according to the invention, which generates functions by the approximation procedure just described. Digital information is supplied in the form of a thirteen bit binary digital $\theta$ signal from a source device, in this case the $\theta$ digital register 20. Each of the bits of $\theta$ signal is an electrical output having a voltage value of either "1" or "0" (zero voltage). The first four bits of the signal are fed by leads 21 to a conventional segment coding matrix 22 which determines the intercept points $A(\theta_n)$. That matrix 22 is comprised of AND/OR logic devices which interpret the digital binary signal from the $\theta$ register and provide a gating "on" signal to one of a set of N output lines 23 corresponding to the N linear segments into which the function $f(\theta)$ has been divided. Each of those lines is associated with one of a set of N normally open voltage switches 24 or gates designated in FIG. 2 as $G_1$, $G_2$, . . . $G_N$. Those switches 24 are conventional switching components, such as the Model 526 Dual Voltage switch manufactured by Vitro Corporation of America, New Jersey.

Given a particular value of $\theta$, the matrix 22 selects and closes the $n$th one of the N gates which yields $\theta_n \leq \theta < \theta_{n+1}$ where $\theta_n$ and $\theta_{n+1}$ are the fixed values of $\theta$ represented by, respectively, the left and right hand end points of the $n$th segment in FIG. 1. In other words, matrix 22 selects and closes the gate representing the segment within whose horizontal range the value of $\theta$ falls. To this end, conventional logic circuits are employed and, with a properly encoded signal, the matrix 22 need respond only to the first (most significant) bits of the digital input signal (i.e., in FIG. 1, to the first four bits of the $\theta$ signal).

For example, assume that the converter is to generate the sine function of FIG. 1 which has been segmented into 16 linear parts. $\Delta\theta$, then, is 90°/16=5.625°. If the first four bits of the digital code represent 45°, 22.5°, and 5.625°, those four bits are sufficient to enable the coding matrix 22 to energize the line corresponding to the particular segment $n$. Thus, if the four most significant bits of the digital signal are 0101 (28.125°), $\theta$ lies between 28.125° and 33.75° ($n$=6) and an activating signal is supplied from the matrix 22 to the voltage switch associated with that segment.

Returning to FIG. 2, a reference voltage E of unit value is supplied to each of the voltage switches 24 and is routed by the closed one of those switches (gated to the "on" condition by a signal from the segment coding matrix 22) to an intercept voltage weighting network 26 and a slope voltage weighting network 28. In each of these networks is a weighting resistor associated with each of the voltage switches 24. Thus, network 26 contains N weighting resistors $Z_1$, $Z_2$ . . . $Z_N$ (one for each of the voltage switches 24) which are connected at a common junction to a common load resistor $Z_L$ for providing N different output voltages. Those resistors are of selected different resistances to each be proportional in resistance value to the value of $\theta$ (FIG. 1) at the lower intercept point of the segment 14 corresponding both to that particular resistor and to the voltage switch associated therewith. The output of network 26 is supplied via isolating resistor 29 to a summing amplifier 30.

The voltage at the output of the intercept voltage weighting network 26 is an analog voltage $EA(\theta_n)$ representing the lower intercept point $A(\theta_n)$ of the $n$th segment. Using FIG. 1 again as an example $N$=16 and $\Delta\theta$=5.625°. If the digital input signal from the $\theta$ register 20 represents an angle of 35°, then $n$=7 (the seventh of 16 segments) and a voltage corresponding to the 33.75° (the lower) intercept point is applied through the input scaling resistor 29 to the operational summing amplifier 30.

The slope voltage weighting network 28 is, like network 26, comprised of N resistors $z_1$, $z_2$ . . . $z_N$ of selected different resistances and coupled to a common load resistor $z_L$. Each of the latter resistors is proportional in resistance value to the value of the slope (FIG. 1) of the segment corresponding to that resistor and the gate associated therewith. Hence, network 28 provides an analog output voltage $EB(\theta_n)$ corresponding to the slope $B(\theta_n)$ of the $n$th segment (in the example, the seventh segment) lying between 33.75° and 39.375°.

A second set 34 of normally open voltage switches or gates $g_1$, $g_2$ . . . $g_9$ are similar to the voltage switches 24 and are each controlled through one of a plurality of leads 35 by a respective one of the nine last or lesser significant bits of the thirteen bit digital $\theta$ signal. The voltage switch unit 34 receives the $EB(\theta_n)$ output voltage and transfers it to a standard binary ladder network 36, which performs a linear digital-analog conversion in a well-known manner. (Representative of this type of digital-analog network is the Model 571 Primary Binary Network purchasable from Vitro Corporation of America, New Jersey.) A number of gates $g$ up to the number of bits required to represent the maximum value attainable by the quantity $\theta-\theta_n$, or 5.625°, is used.

Continuing with the above example, if, as described, a thirteen bit code is used and the first four bits of the $\theta$ signal are fed through leads 21 to supply information to the segment coding matrix 22, the last nine informational bits of that signal are available to control the switches or gates $g_1$ . . . $g_9$. Each of those gates is closed or gated "on" only when the corresponding bit has a value of "1". The product $EB(\theta_n)$ $(\theta-\theta_n)$ appears, therefore, at the output of the linear converter 36, and that output is then coupled to the summing amplifier 30 through the isolating resistor 37.

The analog output signal $E_0$ at the summing amplifier 30 is the sum of the intercept voltage from the network 36, and may be expressed as $$E_0=-E\ [A(\theta_n)+B(\theta_n)\ (\theta-\theta)] \quad (2)$$

or because E is of unit value $$E_0=-[A(\theta_n)-B(\theta_n)(\theta-\theta_n)]\cong sin \quad (3)$$

It is significant, however, to note at this point that the voltage E may itself be of other than unit value, in which case the outputs of the weighting networks 26, 28 will be proportional to the analog input voltage E. Moreover, E may be a variable. Thus, the converter, in accordance with the invention, is adapted to generate the product of a function of a first (digital) variable and a second analog quantity of constant or variable value.

A related aspect of the invention deals with the application of non-linear digital-to-analog conversion to retrieval of the explicit value of a variable which is implicit in a mathematical relation, and in this connection, it will be fruitful to consider a concrete example.

Referring now to FIG. 3, let us assume that a computer system is to solve for the polar angle of a vector R represented by electrical inputs $x$ and $y$ which simulate in analog form the X and Y vector components in Cartesian coordinates of vector R. The length and polar angle of vector R may be representative for example of the ground range and bearing of a target relative to a fire control station.

If a line is drawn from the tip of the X vector perpendicular to the vector R, the length A of that line is a function of the angle $\theta$, defined between the vectors X and R. That is, such line length may be expressed either as $A=X \sin \theta$ or $A=Y \cos \theta$, wherefore $$X \sin \theta - Y \cos \theta = 0 \quad (4)$$

In an analog computer, trigonometric functions of the variable $\theta$, i.e., $\sin \theta$ and $\cos \theta$, can be generated by feeding the $x$ and $y$ inputs through potentiometers driven by a $\theta$ servo or by employing an operation analog function generator. For the various reasons discussed earlier, however, analog computation may be unsuitable, and would be incapable of handling both analog and digital inputs unless each digital signal were processed through a separate digital-analog converter.

Figure 4:
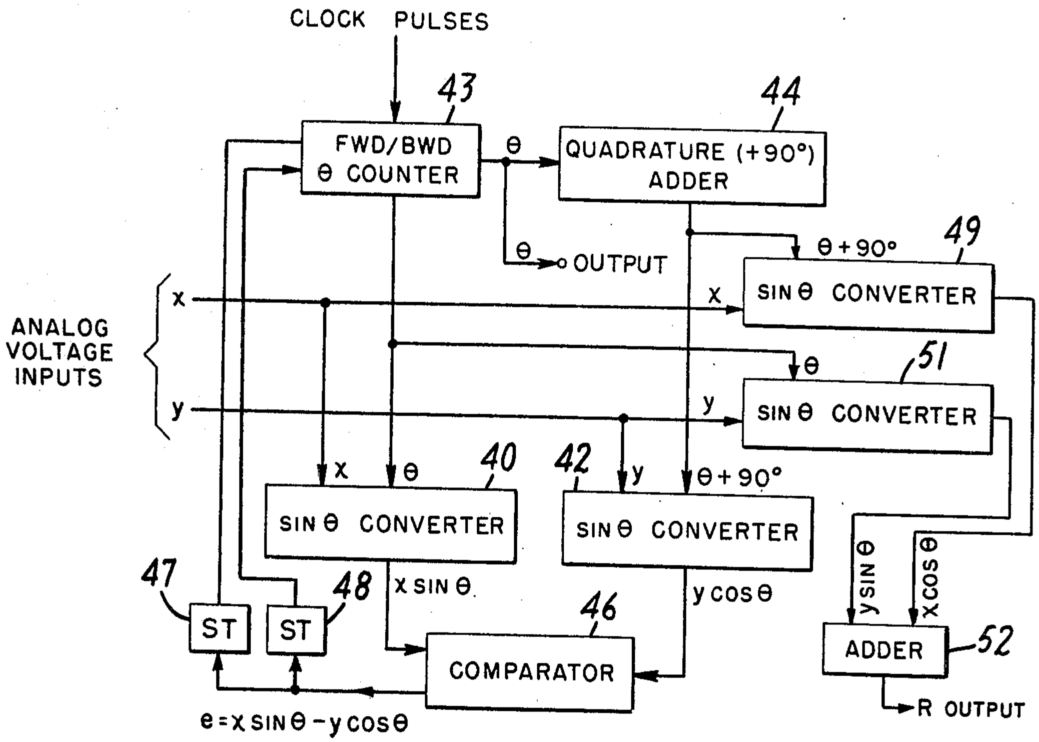
FIG. 4 is a block diagram of a representative computer system utilized in connection with quantities such as represented by the graph of FIG. 3.

FIG. 4 shows a computer system in accordance with the invention utilizing digital-to-analog non-linear conversion in solving for the dependent variable $\theta$ of FIG. 3. As shown, the only inputs to the system are the $x$ and $y$ analog signals from which it is desired to derive (from the relationship developed in connection with FIG. 3) a digital signal representative of $\theta$. Accordingly, the $x$ and $y$ analog inputs are fed into non-linear digital-to-analog converters 40 and 42, each of whose outputs represents the product of a respective one of the analog input variables and a non-linear trigonometric (sine or cosine) function of the variable $\theta$. Each of the converters 40 and 42 are of the type discussed above in connection with FIG. 2. Since the analog input voltages (E in FIG. 2) for the converters represent in FIG. 4 the variables $x$ and $y$, the converter outputs are analog signals corresponding to a product of one of the variables $x$, $y$ times the sine (or cosine) function of $\theta$. Specifically, the output of converter 40 is an analog signal representative of the quantity $X \sin \theta$, and the output of converter 42 is representative of the quantity of $Y \cos \theta$.

A counting unit 43, preferably of the forward-backward type, i.e., the type which is capable of increasing or decreasing its count, receives pulses from a clock-pulse generator (not shown) and, when enabled, responds to each such pulse to count up or down as instructed by an enabling error signal. The digital count attained by the counter 43 represents an instantaneous solution of the desired variable $\theta$. The digital count from the $\theta$ counter 43 is supplied to the $\sin \theta$ converter 40, along with the analog $x$ input, to generate the $X \sin \theta$ term of expression (4). This same digital count is also processed through a Quadrature Adder 44 which digitally adds 90° to the angle $\theta$ and provides a signal representative of the sum $(\theta+90°)$ to the $\sin \theta$ converter 42. The analog $y$ input signal is fed directly to the $\sin \theta$ converter 42. $\cos \theta = \sin (\theta+90°)$, the output of the $\sin \theta$ converter 42 is $Y \cos \theta$. Each of converters 40 ad 42 is the same as or similar to the FIG. 1 converter.

The $X \sin \theta$ and the $Y \cos \theta$ analog signals are then compared in the comparator 46, which produces an output error signal $e=x \sin \theta - y \cos \theta$. The comparator 46 may be, for example, a differential amplifier whose output feeds conventional trigger circuits such as a pair of Schmitt triggers 47 ad 48. Since the job of the comparator 46 is to enable the $\theta$ counter 43 to count either up or down, the magnitude of the error signal $e$ is not critical, i.e., the error signal $e$ need not be a true analog of the difference $X \sin \theta - Y \cos \theta$. When the error signal $e$ is positive, the error signal triggers circuit 47 "on" to gate counter 43 to count down so that the registered count or $\theta$ signal decreases to drive $e$ towards zero. A negative error signal triggers circuit 48 "on" to gate counter 43 to count up so as to increase the registered count to again drive $e$ towards zero. In either case, when the $\theta$ counter obtains a count which yields the particular solution of the equation $X \sin \theta - Y \cos \theta = 0$, the error signal $e$ will be zero, neither of circuits 47 and 48 will be triggered "on" so as to enable the counter, and the $\theta$ counter 43 accordingly stops counting. At this time, the digital count represents $\theta$. Thus, this computer system develops two analog signals, $x \sin \theta$ and $y \cos \theta$, and a digital signal $\theta$, all of which may be used for subsequent computation.

As indicated by FIG. 3, the scalar magnitude of vector R is given by $$R = B + C = X \cos \theta + Y \sin \theta \quad (5)$$

To the end of obtaining such scalar magnitude, in the FIG. 4 system, inputs of the analog $x$ signal and of the digital $(\theta+90°)$ signal are fed to a $\sin \theta$ converter 49 of the type described, and inputs of the analog $y$ signal and of the digital $\theta$ signal are fed to a similar $\sin \theta$ converter 51. The output of unit 49 is representative of $Y \sin \theta$, whereas the output of unit 51 is representative of $X \cos \theta$. The two converter outputs are added together in adder 52 to provide therefrom an output which is representative of $X \sin \theta + Y \cos \theta$ and hence, of the scalar magnitude of the vector R.

Among other uses of the FIG. 4 data coordinate converter, it is well adapted in a fire control system to mate a target data transmitter of rectangular coordinate data outputs to a fire control computer designed to operate from polar coordinate input data. Other uses of the FIG. 4 device will be readily apparent to those skilled in the art.

FIG. 5 shows how a portion of the FIG. 4 system may be used to retrieve the explicit value of a variable from a mathematical relation in which such value is implicit. In FIG. 5 the specific mathematical relation involved is:

$$Y - X \sin \theta = \theta \quad (6)$$

and $\theta$ is the variable whose explicit value is to be determined for respective given values of X and Y. The digital signal is fed from its source (forward-backward counter 43) to non-linear function converter 40 which also receives an analog input $x$ representative of quantity X. As before, converter 40 yields an output $X \sin \theta$ which is supplied to comparator 46 along with an input directly thereto of an analog signal $y$ representative of quantity Y. The comparator simulates the mathematical relation from which the explicit value of $\theta$ is to be obtained. If at any time, source 43 does not yield a digital $\theta$ signal which represents the desired explicit value, then, as described, comparator 46 generates an error signal which operates on source 43 to change the $\theta$ signal until stable conditions are established in the closed loop of the FIG. 5 system. When stability is reached, the output $\theta$ signal from source 43 represents the explicit value of $\theta$ which satisfies expression (6) for the given values in that expression of X and Y.

Figure 6:
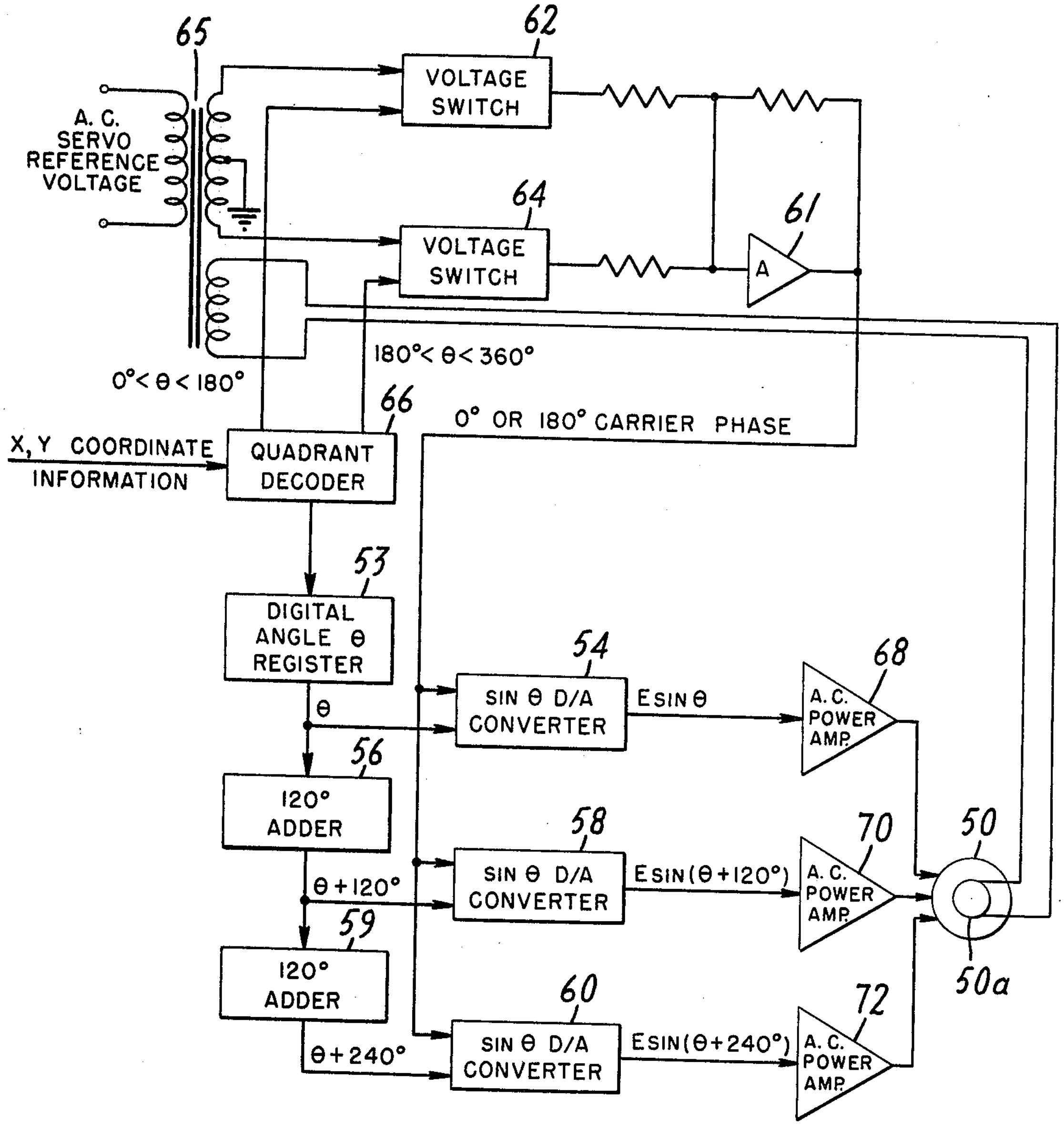
FIG. 6 is a block diagram of a servo carrier generator utilizing non-linear digital-to-analog conversion to obtain signals for exciting the windings of a receiver.

Referring now to FIG. 6 there is shown a servo carrier generator which is utilized for exciting the windings of a synchro receiver 50 having a rotor 50*a* positioned by the relative degree of energization of the three windings of the synchro. That generator is capable of providing three (or any number of) alternating current analog signals whose relative magnitudes are proportional to functions of angles having a phase-displaced relationship. That is, if one of the output signals is proportional to $f(\theta)$, the other outputs may be expressed as proportional to $f(\theta+Kn)$, where K is a constant (e.g., 120°) and $n$ is an integer 0, 1, 2, 3 . . . .

Accordingly, the three A.C. signals at the output of the generator have magnitudes proportional to, respectively, sin $\theta$, sin $(\theta+120)$, and sin $(\theta+240°)$. The constant angles of 120° between consecutive signals correspond to the angular displacement of the magnetic axes of the synchro stator windings. Therefore, the voltages applied to the windings are the same as those which would be induced in the stator windings if those voltages were to be received from a synchro transmitter wherein the rotor is positioned at an angle $\theta$ from some reference angle.

In accordance with the invention, the variable angle $\theta$, represented by a digital signal from the digital angle register 53, feeds the first sin $\theta$ digital-analog converter 54. To this digital signal is added a digital signal corresponding to 120°, so that a digital signal representing $(\theta+120°)$ from the 120° adder 56 feeds the second sin $\theta$ digital-analog converter 58. Similarly, the adder 59 adds another 120° to the (0+120°) signal to give a (0+240°) digital signal to the third sin $\theta$ digital-analog converter 60. Each of converters 54, 58 and 60 is the same as or similar to the FIG. 2 converter. An A.C. carrier reference signal is supplied to each of the converters 54, 58, 60 from the amplifier 61.

In selsyn transmitter devices the phase of voltages generated in the respective transmitter stator windings reverses as the excited rotor is driven through 180 mechanical degrees. This phase reversal must therefore be simulated in order to preclude 180° positional ambiguity of the synchro rotor 50*a*. In the generator of FIG. 6, this can be accomplished by reversing the phase of the carrier reference voltage supplied to the sin $\theta$ converters when $\theta$ reaches 180° relative to some arbitrary angle taken as the zero reference. The circuits in the FIG. 6 system for effecting that phase reversing operation are as follows.

The rotor 50*a* and a pair of conventional voltage switches 62 and 64 are excited with an A.C. servo reference voltage through a transformer 65. The voltage switches 62, 64, are controlled by signals from a quadrant decoder 66 which produces a gate signal signifying that the angle $\theta$ lies either between 0° and 180° or between 180° and 360°. For illustrative purposes, the quadrant decoder 66 is shown receiving coordinate information (i.e., $x$ and $y$) from a separate source. However, any other suitable method may be employed to control the voltage switches 62, 64, depending on the particular type of digital equipment.

Returning to FIG. 6, depending on which of the switches 62, 64 is energized by the quadrant decoder 66, either a 0° or 180° reference carrier phase is supplied to the A.C. operational amplifier 61, producing respective 0 or 180° phase excitation voltages at the outputs of each of the digital-analog converters 54, 58, 60. This, in effect, simulates the phase reversal of the voltage induced in the stator windings of a synchro as the rotor rotates through 180°.

It should be noted here that the converters 54, 58, and 60, could generate cos functions to get the same final result, since this would merely shift the electrical zero point by 90°. Also any reference angle (i.e., 0° electrical angle) can be established by merely adding a constant angle to the content of the $\theta$ register before the digital information is fed to the adders 56, 59 and the sin $\theta$ converter 54.

To increase the ability of the generator to drive heavier loads, such as several synchro receivers in parallel, the output signals from the converters are fed to A.C. power amplifiers 68, 70, 72 intermediate the converters and the synchro stator windings. Thus, the generator of FIG. 5 fully replaces a servomechanism and completely eliminates the drawbacks of electro-mechanical components.

The systems described herein have wide application to computing operations involving non-linear functions and in which the computer must handle both analog and digital information. Moreover, when the described systems are employed for deriving polar coordinate values from Cartesian coordinate values, computations may be carried out for a single polar quadrant, such as 0°–90°, and by conventional methods of complementing (with either 90° or 180°), a complete range of solutions is available betwen 0° and 360. For example, a computation involving sin 100° may be formed merely by complementing by 180°, i.e., 180°−100°=80° and preserving the proper sign convention for the particular polar quadrant.

The specific embodiments of the invention described herein are illustrative only, and it is understood that many modifications and variations may be made therein within the skill of the art. All such modifications and variations, therefore, are intended to be included within the scope and spirit of the appended claims.

We claim:

1. A computer system for obtaining a digital output signal, representing a polar angle $\theta$, from a solution of the equation $x \sin \theta = y \cos \theta$, where $x$ and $y$ are variable input quantities on Cartesian coordinate axes defining the angle $\theta$, comprising:

converter means jointly responsive to the digital output signal and to analog signals representing the variable input quantities $x$ and $y$ for generating analog signals representing the products $x \sin \theta$ and $y \cos \theta$;

means for comparing the analog product signals to produce an error signal; and digital counting means responsive to the error signal for producing a digital output signal having a value corresponding to the angle $\theta$ at which the product signals are equal.

2. A computer system according to claim 1, in which: the converter means generates the function sin $\theta$.

3. A computer system according to claim 1, further comprising:

adder means responsive to the digital output signal for adding thereto a digital quantity to produce a signal representing the angle $(\theta+90°)$, the converter means including a first circuit responsive to the error signal to generate the function sin $\theta$ and means generative of the function sin $\theta$ and responsive to the $(\theta+90°)$ signal to produce the function cos $\theta$.

4. A computer system as defined in claim 1, further comprising:

means responsive to the analog signals representing the $x$ and $y$ quantities for complementing the count in the counting means by an amount representing a multiple of 90° to obtain a solution of the equation $x \sin \theta = y \cos \theta$ for all angles between 0° and 360°.

5. A computer system for obtaining a digital output signal representing a polar angle $\theta$ defined by Cartesian coordinate variables $x$ and $y$, comprising:

digital function generator means responsive to the digital output signal and to signals representing the coordinate variables $x$ and $y$ for generating electrical signals representing the products $x \sin \theta$ and $y \cos \theta$ for magnitudes of an angle between 0° and 90°;

means for comparing the product signals for generating a control signal when the two products are unequal in magnitude; and digital counting means responsive to the control signal for generating a digital signal having a value corresponding to the polar angle $\theta$ at which the two products are equal.

References Cited

UNITED STATES PATENTS

| | | | |
|---|---|---|---|
| 3,016,528 | 1/1962 | Villars | 340—347 |
| 3,241,133 | 3/1966 | Herzl | 340—347 |
| 3,250,905 | 5/1966 | Schroeder | 340—347 X |

MAYNARD R. WILBUR, Primary Examiner

G. R. EDWARDS, Assistant Examiner

U.S. Cl. X.R.

235—150.53